United States Patent
Fenton et al.

(10) Patent No.: US 10,458,792 B2
(45) Date of Patent: Oct. 29, 2019

(54) REMOTE SURVEY SYSTEM

(71) Applicant: NovAtel Inc., Calgary (CA)

(72) Inventors: Patrick C. Fenton, Calgary (CA); John B. Schleppe, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 489 days.

(21) Appl. No.: 15/380,052

(22) Filed: Dec. 15, 2016

(65) Prior Publication Data

US 2018/0172840 A1 Jun. 21, 2018

(51) Int. Cl.
| | |
|---|---|
| *G01C 11/02* | (2006.01) |
| *G01S 19/48* | (2010.01) |
| *G01S 5/16* | (2006.01) |
| *G01C 15/00* | (2006.01) |
| *G01C 11/06* | (2006.01) |

(52) U.S. Cl.
CPC .............. *G01C 11/02* (2013.01); *G01C 11/06* (2013.01); *G01C 15/002* (2013.01); *G01S 5/16* (2013.01); *G01S 19/48* (2013.01)

(58) Field of Classification Search
CPC ........................ G01S 19/48; G01S 5/16; G01C 11/30; G01C 11/06–28; G01C 11/02
See application file for complete search history.

(56) References Cited

U.S. PATENT DOCUMENTS

| | | |
|---|---|---|
| RE41,175 E | 3/2010 | Vashisth et al. |
| 8,416,130 B2 | 4/2013 | Scherzinger |
| 2012/0163656 A1* | 6/2012 | Wang ...................... G01S 19/48 382/103 |
| 2017/0067739 A1* | 3/2017 | Siercks .................. G01C 11/02 |

* cited by examiner

*Primary Examiner* — Bernarr E Gregory
*Assistant Examiner* — Fred H Mull
(74) *Attorney, Agent, or Firm* — Cesari and McKenna, LLP

(57) ABSTRACT

A remote survey system uses a GNSS receiver, an on-board camera and a vision subsystem to provide real time three-dimensional (3D) global position information for a survey point that is in a location in which access to line-of-sight GNSS satellites signals is restricted. The camera takes images of the restricted access survey point location from unrestricted access locations and the GNSS receiver determines associated global positions. The vision system tracks an object of interest and at least three secondary objects at the restricted access survey point location in a plurality of the images and determines the positions of the objects relative to the camera and the orientations of the camera for the respective images. Using the relative positions, the camera orientations and the global positions of the camera, the vision subsystem calculates the global position of the restricted access survey point.

20 Claims, 4 Drawing Sheets

REMOTE SURVEY SYSTEM

BACKGROUND OF THE INVENTION

Field of the Invention

The invention relates generally to surveying systems and, in particular, to surveying systems that operate in restricted coverage environments.

Background Information

Surveying systems typically include GNSS receivers. The systems are transported to respective survey points and the GNSS receivers utilize GNSS satellite signals to determine precise three-dimensional (3D) global positions of the survey points. The surveying process works well as long as the system has, at the locations of the respective survey points, access to line-of-sight GNSS satellite signals from a sufficient number of GNSS satellites.

When the system does not have sufficient access to the line-of-sight GNSS satellite signals at the location of a given survey point, the operator typically has to set up a tripod to determine the 3D global position using conventional optical, laser and/or tape measurement methods. These operations are time consuming and thus costly.

Alternatively, the system may utilize measurements from an on-board inertial navigation system to determine the position of the given survey point, by taking measurements of the movement of the systems to the given survey point from a survey point for which a 3D global position has been determined using GNSS satellite signals. For the required position accuracy, however, a high precision, and thus costly, inertial system is required.

SUMMARY OF THE INVENTION

A remote survey system utilizes a GNSS receiver, an on-board camera with known characteristics, and a vision subsystem to provide real time three-dimensional (3D) global position information for at least for survey points that are in locations in which access to line-of-sight GNSS satellites signals is restricted. To determine the 3D global position of a survey point that is in a location with restricted access to the GNSS satellite signals, the on-board camera takes, from various spatially diverse locations with sufficient access to the GNSS satellite signals, a plurality of images in which an identifiable object of interest at the survey point location is within the field of view of the camera. The system determines the global position of the camera using the available GNSS satellite signals and a known camera offset and time tags the position and the images. The vision subsystem analyses the plurality of images and tracks the object of interest and at least three secondary identifiable objects. Based on the known camera characteristics, the vision subsystem determines the orientation of the camera and the position of the object of interest relative to the camera in the respective images. Then, based on the global positions of the camera when the respective images were taken, the vision subsystem determines the 3D global position of the object of interest, and thus, the survey point, with the required accuracy.

The remote survey system may provide one or more of the images to the operator via a touch screen display. The operator identifies an object of interest at the survey point in at least one image by touching the screen. The vision subsystem then tracks the identified object of interest across a plurality of images taken from multiple locations and performs the global position calculations. In addition, the system may indicate to the operator when the 3D global position of the object of interest, and thus, the survey point, has been determined with sufficient accuracy for inclusion in the survey. Before such an indication, the operator directs the remote survey system to continue taking images of the restricted access survey point location from additional locations while the operator is enroute to one or more next survey point locations. Alternatively, or in addition, the images may be taken from various other survey point locations, as the operator continues to conduct the survey. As appropriate, the global positions for the survey points at unrestricted access locations may also be determined by the vision subsystem using images that include the unrestricted access survey point locations.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
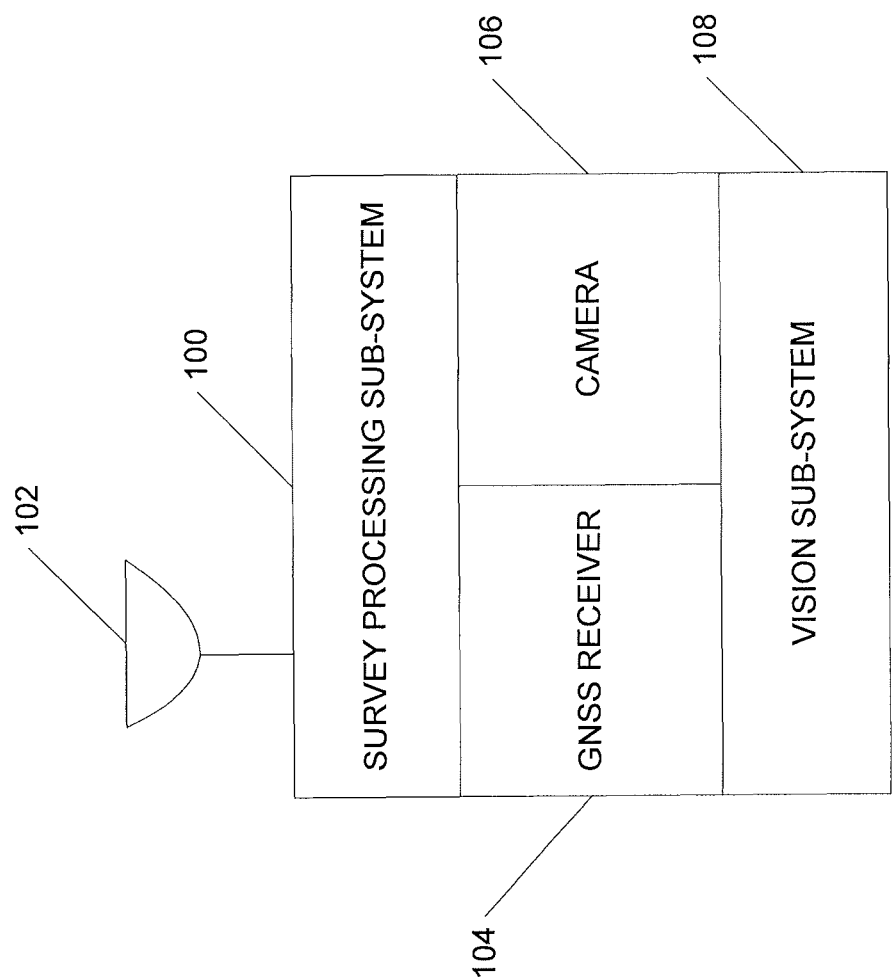
FIG. 1 is a functional block diagram of a remote survey system.
Figure 2:
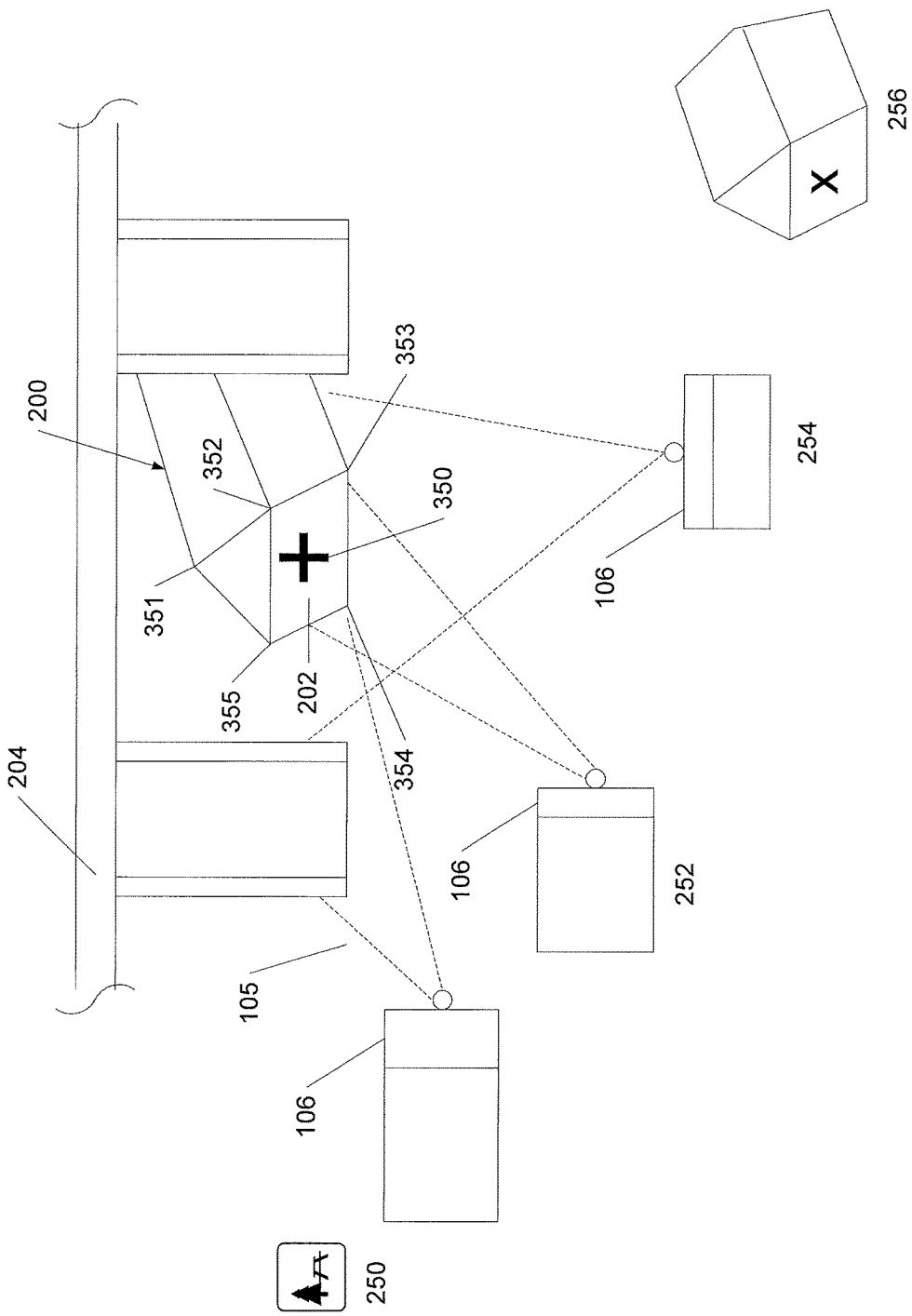
FIG. 2 is a diagram of a survey site.

Referring to FIGS. 1 and 2, a remote survey system includes a survey processing subsystem 100 and a GNSS antenna 102 that receives line-of-sight GNSS satellite signals and RTK information from one or more GNSS base stations (not shown). An operator operates the survey processing subsystem 100 in a known manner to direct the remote survey system to survey point locations. The GNSS antenna 102 provides the GNSS satellite signals and RTK information to a GNSS receiver 104, which operates in a known manner to determine a three-dimensional (3D) global position of the system, or more precisely the GNSS antenna, to within the tight tolerances of the survey based on the GNSS satellite signals received from a sufficient number of GNSS satellites. In the example, the positions have centimeter accuracy.

A camera 106 with known characteristics is located a known distance from the GNSS antenna 102, such that an offset between the optical center of the camera and the phase center of the GNSS antenna is known. As directed, the camera 106 takes images of survey point locations and provides the images to a vision subsystem 108. As discussed in more detail below, the vision subsystem uses the images to determine the global 3D positions of survey points that are in environments that have restricted access to line-of-sight GNSS satellite signals, and for which the 3D global position can therefore not be determined using the GNSS satellite signals.

To conduct a survey, an operator directs the movement of the remote survey system over a survey site along a route that encompasses the survey points, in order to determine the precise 3D global locations of the respective survey points. For the survey points that are in locations in which the GNSS receiver 104 receives line-of-sight GNSS satellite signals from at least a minimum number of GNSS satellites required to calculate a 3D global position with the accuracy required by the survey, that is, for survey points in locations with "unrestricted" access to the GNSS satellite signals, the remote survey system utilizes the GNSS satellite signals received at the survey point location to calculate the 3D global position of the survey point. In the example, the remote survey system utilizes the GNSS satellite signals to determine the 3D global positions of the survey points 250 and 256. The survey processing subsystem 100 coordinates the 3D global positions with the respective survey points. The survey processing subsystem provides a user interface through which the operator may name the respective survey points, and the subsystem stores the positions and the associated names.

If a survey point is instead in a location in which a 3D global position cannot be determined with the required accuracy using the available line-of-sight GNSS satellite signals, that is, if the survey point is in a "restricted" access location, such as survey point 350, the remote survey system determines the 3D global position of the survey point using camera images that contain the survey point location. As the remote survey system travels along the route, the camera 106 takes a plurality of images that contain the restricted access survey point from various locations that each have sufficient access to the line-of-sight GNSS satellite signals, that is, from various unrestricted access locations. One or more of the unrestricted access locations may, but need not, be the locations of other survey points, in the example, the locations 250 and 256. Alternatively or in addition, the unrestricted locations may be various locations on the route between the respective survey points, such as locations 252 and 254. The images are provided to the vision subsystem 108, which determines the 3D global position of the restricted access survey point using 3D triangulation techniques, as described below. The survey processing subsystem 100 allows the operator to select respective survey points for which the vision subsystem 108 calculates the 3D global positions, and the subsystem coordinates the positions determined by the vision subsystem with the selected survey points, names the survey points, and stores the positions and names.

The operation of the remote survey system is described by way of example. The restricted access survey point location 350 is on a wall 202 of a building 200 that is located under an overpass 204. The overpass adversely affects line-of-sight GNSS satellite signal reception at the survey point location, such that the remote survey system will not be able to determine the 3D global position of the survey point 350 to within the accuracy required for inclusion in the survey using the GNSS satellite signals available at the survey point location. Accordingly, the operator selects the survey point as one for which the vision subsystem 108 will determine a 3D global position and the operator bypasses the restricted access survey point location 350 and directs the remote survey system along the route toward the next survey point. While traveling, the operator directs the camera 106 to take images in which the survey point 350 is in the field of view 105 (indicated by dotted lines) of the camera 106.

At the various locations at which images are taken, the GNSS receiver 104 calculates a 3D global position and time tags the position with GNSS time or time from a local source. The time is also provided to the vision system 108, which time tags the images taken by the camera. The vision system thereafter calculates the 3D global position of the restricted access survey point 350 using the time tagged positions and images, as described below. The survey processing subsystem then coordinates the position with the bypassed survey point and stores the position and the name of the survey point.

Figure 3:
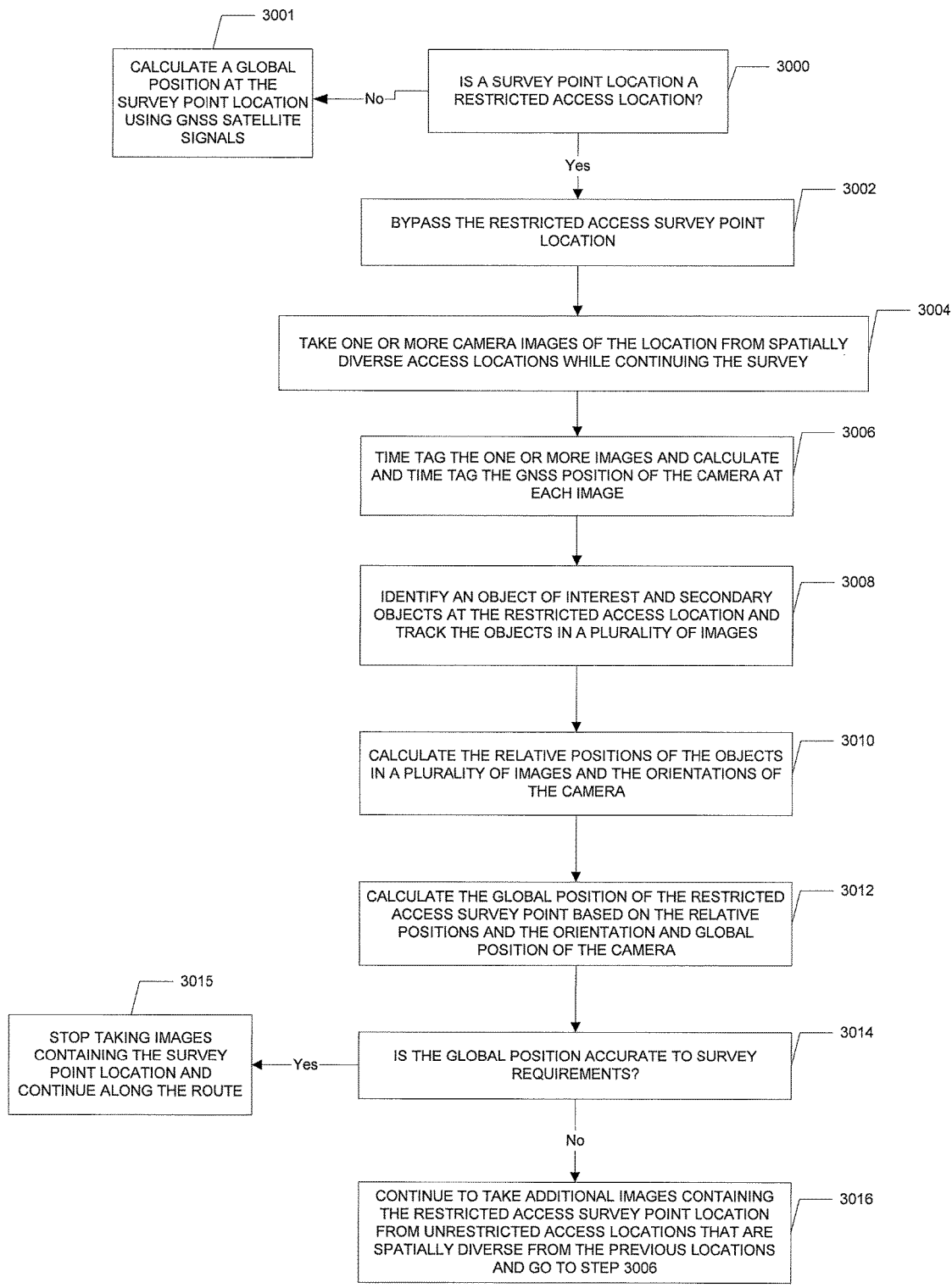
FIG. 3 is a flow chart of the operations of a system that utilizes the remote survey system of FIG. 1.

Referring now also to FIG. 3, when the operator determines that a next survey point 350 is in a restricted access location, the operator directs the remote survey system to bypass the survey point location. (Steps 3000, 3002). To calculate the 3D global position of the restricted access survey point 350, the remote survey system travels along the route and pauses in at least three spatially diverse unrestricted access locations 250, 252, 254 from which the camera 106 has the survey point 350 in the camera field of view 105 and the camera takes images that include the survey point 350.

At the first unrestricted access location 250, the GNSS receiver 104 determines the 3D global position of the GNSS antenna 102, using the line-of-sight GNSS satellite signals provided by the GNSS antenna 102. The system uses the GNSS position and the known camera offset to determine the global position of the camera. The system then time tags the position information with GNSS time or, as appropriate, a time determined from a local clock or other source. At the same time, in step 3004, the camera 106 takes one or more images in which an object of interest at the survey point location 350 and at least three other objects i.e., secondary objects, can be identified. In the example, the one or more images include as the object of interest the X mark on the wall 202 and at least three of the secondary identifiable objects 351-355, which are features of the building wall 202, namely, corners 352-355 of the wall 202 and a roof peak 351. Notably, the secondary objects 351-355 have good spatial diversity in the images.

The vision subsystem 108 time tags the respective camera images with the GNSS or local clock time, as appropriate, such that the images can be associated with the calculated global position of the camera at the time the images were taken. (Step 3006).

The remote survey system then moves to and pauses at a second unrestricted access location 252 in which the camera 106 has in its field of view 105 the object of interest, and at least three of the identified secondary objects 351-355. The GNSS receiver 104 again calculates the 3D global position of the GNSS antenna 102 using the available line-of-sight GNSS satellite signals and the system applies the camera offset to determine the global position of the camera. The system then time tags the position information. The camera takes one or more images that include of the object of interest and at least three of the secondary objects 351-355 and the system time tags the images.

The remote survey system performs the same operations when the system moves to at least a third unrestricted access location 254, and so forth. Notably, the three locations 250, 252 and 254 have good spatially diversity with respect to the object of interest, in the sense that they are not in a straight line relative to the object of interest. The operator may, but need not, move to additional locations such as a next survey point location 256 and take additional images that include the object of interest and at least three of the other identifiable objects 351-355.

The vision subsystem 108 analyzes the images taken from the unrestricted access locations and tracks the object of interest and at least three of the secondary objects 351-355 in a plurality of the images using known pattern matching techniques (step 3008). As discussed below, the vision subsystem 108 uses known pattern or feature detection processing such as, for example, SIFT to detect the patterns in the respective images. Based on the known characteristics of the camera 106, such as, for example, the focal point, the vision subsystem 108 operates in a known manner to determine the locations of the object of interest and the secondary objects relative to the camera in the respective images (step 3010). The vision system also determines the orientations of the camera for each of the images based on the relative locations of the secondary objects in the images.

Next, the vision subsystem 108 calculates the 3D global position of the object of interest using 3D triangulation based on the relative positions of the object of interest in the images, the orientation of the camera, and the global positions of the camera. (Step 3012). The vision subsystem thus uses the calculated positions of the objects of interest relative to the camera and the camera orientations to define possible global locations as spheres centered at the camera locations, and then determines the 3D global location of the object of interest as the intersection of the spheres. Alternatively, the system uses other known 3D triangulation techniques.

The vision system also operates in a known manner to determine if the global position calculated from the images is within the accuracy required by the survey based on associated variances. (Step 3014). If the 3D global position is determined to be within the required accuracy, the survey system instructs the operator to discontinue taking images of the restricted access (step 3015) survey point location. Otherwise, the survey system instructs the operator to continue to take additional images of the restricted access survey point location 350, and the operator directs the camera 106 to take images from various other spatially diverse locations, and the vision system continues to refine and improve the accuracy of calculated global position coordinates of the restricted access point using all of the images collected. (step 3016). The survey processing subsystem 100 may, for example, provide to the operator a list, chart or other indicator of the survey points for which the vision subsystem is calculating global positions and remove from the list the survey points for which the global positions have been determined.

Figure 4:
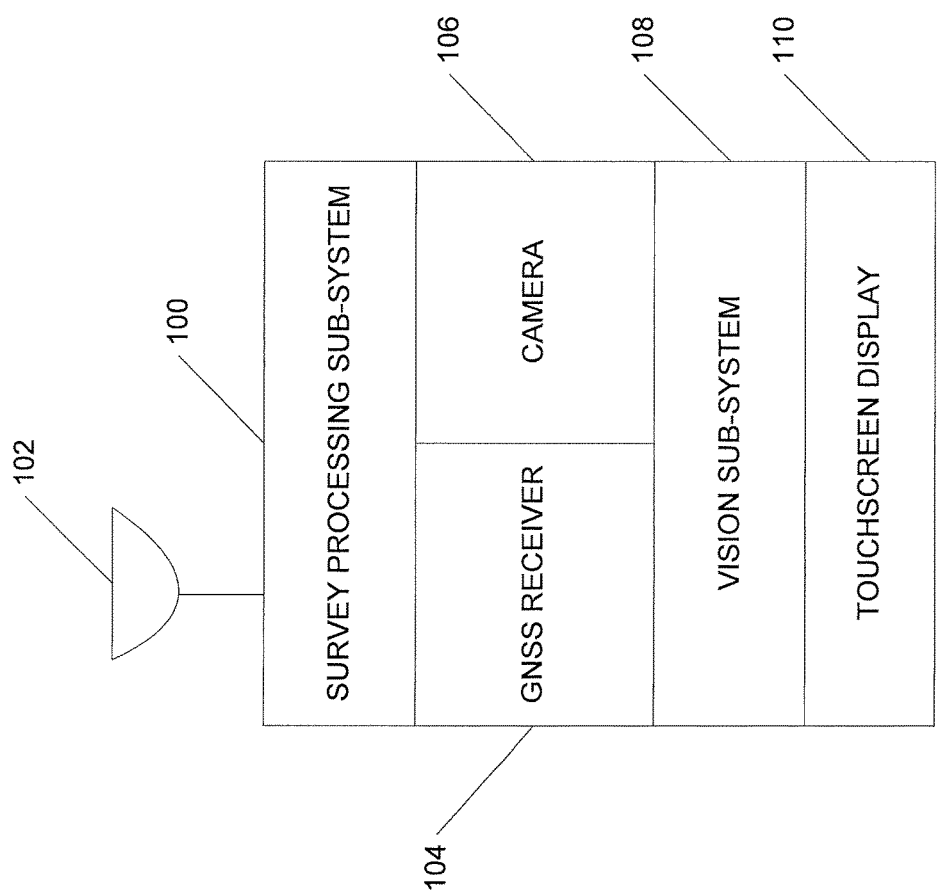
FIG. 4 is a functional block diagram of an alternative remote survey system.

Referring also to FIG. 4, the remote survey system may include a touch screen 110 on which the system displays one or more of the images to the operator. The vision subsystem determines objects as patterns in the displayed images based using known feature processing techniques and identifies the objects in the displayed image or images. the operator may then select an object of interest in at least one of the images by, for example, touching the corresponding location on the screen. The vision subsystem 108 then tracks the identified object in other images using known pattern matching techniques. Similarly, the operator may identify the secondary objects in the image, by subsequently touching the other identifiable objects. Alternatively, the vision subsystem 108 may identify the secondary objects as identifiable patterns in the images based on known pattern matching techniques. The operator may, but need not, identify the object of interest and/or the secondary objects in additional displayed images. Alternatively, the vision subsystem may track the identified object of interest and the secondary identified or identifiable objects in the additional images using the pattern matching techniques.

The remote survey system continues on the route and determines the global positions of unrestricted access survey point locations using the GNSS satellite signals and determines the global position of restricted access survey point locations based on images taken by the camera 106. Thus, the operator bypasses each restricted access survey point location and continues along the route to other survey point locations, pausing only to take images of the restricted access survey point locations with the camera 106. The vision system determines the global positions of the bypassed survey points based on the images that contain the respective bypassed survey point locations, as the surveying of other survey points continues. Accordingly, the remote survey system need not track its movements from nearby survey point locations in unrestricted access locations to the restricted access survey point locations using, for example, precision inertial sensors, as is required using known prior systems.

The camera 106 may take images in which more than one restricted access survey point location is in view. The operator may then identify multiple objects of interest and associated secondary objects within each of the images, and the vision system may then track the respective objects of interest in the images. The vision subsystem can then determine the 3D global positions of the various objects of interest, and thus, of the associated multiple survey points, in the manner described above.

The remote survey system 100 may utilize the vision subsystem 108 to determine the 3D global positions of all of the survey points, not just the survey points at restricted access locations. To determine the 3D global position of any one of the survey points, the operator directs the camera 106 to take images from at least three spatially diverse unrestricted access locations in which the survey point is in view, and using the images and associated global positions associated with the images the vision subsystem determines the 3D global position of the survey point in the manner discussed above. The remote survey system may also operate in the same manner to determine the 3D global positions of various other points of interest at the survey site that are selected by the operator as the remote survey system moves over the survey site.

What is claimed is:

1. A method of operating a remote survey system including
    determining a route to conduct a survey over a plurality of survey points for a remote survey system with a GNSS receiver, an on-board camera with known characteristics and a vision subsystem;
    for a given survey point location on the route determining if the GNSS receiver will have sufficient access to GNSS satellite signals at the location to calculate a global position of the survey point within system accuracy requirements;
    if the access to the GNSS signals will be sufficient at the given survey point location directing the remote survey system to travel to the given survey point location and determine the global position of the survey point based on received GNSS satellite signals;
    if the access to the GNSS signals will not be sufficient at the given survey point location,
        bypassing the given survey point location and directing the remote survey system along the route toward other survey point locations and while traveling directing the camera to take images of the given survey point location from at least three spatially diverse locations that have sufficient access to GNSS satellite signals and from which the camera has the given survey point location in a field of view,
        calculating the global position of the camera and time tagging the position,
        identifying the given survey point location as an object of interest in at least one of the images and tracking the object of interest and at least three identifiable secondary objects in a plurality of the images taken from the at least three different locations, calculating the position of the object of interest and the secondary objects relative to the camera in the selected plurality of images, calculating the orientations of the camera for the respective selected plurality of images, and calculating a global position of the survey point location based on the relative positions, the calculated orientations of the camera and the global positions of the camera when the respective selected images were taken.

2. The method of claim 1 wherein one or more of the other locations are locations of survey points on the route.

3. The method of claim 1 wherein one or more of the other locations are on the route between the survey points.

4. The method of claim 1 wherein the secondary objects are spatially diverse with respect to the given survey point.

5. The method of claim 1 wherein the remote survey system is directed to stop taking images of the given survey point location once a global position within a required tolerance is calculated for the survey point using the images.

6. The method of claim 1 wherein the images contain more than one object of interest and the global positions of more than one survey point are determined from the images.

7. A remote survey system including a survey processing subsystem configured to process and store position information for a plurality of survey points;

an on-board camera with known characteristics, the camera taking images of a given restricted access survey point location;

a GNSS antenna and GNSS receiver that determines global position using GNSS satellite signals received by the antenna;

a vision subsystem configured to determine a global position for the survey point at the given restricted access survey point location using the images taken by the camera and associated global positions determined by the GNSS receiver, the vision subsystem configured to track an object of interest and at least three secondary objects at the given survey point location in a plurality of the images taken from the at least three spatially diverse locations, calculate the orientations of the camera for the respective selected plurality of images, calculate a position of the object of interest and the secondary objects relative to the camera in each of a plurality of images, and calculate a global position of the given survey point based on the calculated relative positions of the objects, the calculated orientations of the camera and global positions of the camera when the images were taken as determined from the associated global positions;

the survey processing subsystem coordinating the global positions determined by the vision subsystem with the associated survey points at the restricted access survey point locations.

8. The system of claim 7 wherein
the system time tags the images taken by the camera and the associated global positions determined by the GNSS receiver, and the system determines the global position of the camera for each of the images based on a known offset between the optical center of the camera and the phase center of the GNSS antenna.

9. The system of claim 7 further including
a display, and
the vision subsystem being further configured to display an image on the display and determine an object of interest in the image based on input from an operator.

10. The system of claim 9 wherein
the display includes a touch screen, and
the vision subsystem is configured to identify the objects of interest based on a touch of the screen.

11. The system of claim 10 wherein the vision subsystem is configured to identify multiple objects based on multiple touches of the screen.

12. The system of claim 10 wherein the vision subsystem tracks objects associated with multiple restricted access survey point locations in a given image.

13. The system of claim 7 wherein the survey processing subsystem further coordinates global positions determined by the GNSS receiver with survey points at unrestricted access survey point locations.

14. The system of claim 7 wherein
the camera takes images of a given unrestricted access survey point location;
the vision subsystem is further configured to determine a global position for a survey point at the given unrestricted access survey point location using a plurality of the images that include the unrestricted access survey point location taken from the at least three spatially diverse locations and associated global positions determined by the GNSS receiver, and
the survey processing subsystem further coordinates global positions determined by the vision subsystem with survey point at the unrestricted access survey point location.

15. The system of claim 14 wherein
the camera takes images of locations of points of interest at the survey site,
the vision subsystem is further configured to determine a global position for a point of interest using the images taken by the camera and associated global positions determined by the GNSS receiver, and
the survey processing subsystem further coordinates global positions determined by the vision subsystem for the points of interest at the point of interest locations.

16. A method of operating a remote survey system including
determining a route to conduct a survey over a plurality of survey points for a remote survey system with a GNSS receiver, an on-board camera with known characteristics and a vision subsystem;
directing the remote survey system along the route and for a given survey point location directing the camera to take images of the given survey point location from at least three spatially diverse locations that have sufficient access to GNSS satellite signals and from which the camera has the given survey point location in a field of view,
calculating the global position of the camera using received GNSS satellite signals and time tagging the position,
identifying the given survey point location as an object of interest in at least one of the images and tracking the object of interest and at least three identifiable secondary objects in a plurality of the images taken from the at least three different locations, calculating the position of the object of interest and the secondary objects relative to the camera in the selected plurality of images, calculating the orientations of the camera for the respective selected plurality of images, calculating a global position of the survey point location based on the relative positions, the calculated orientations of the camera and the global positions of the camera when the respective selected images were taken.

17. The method of claim 16 wherein the secondary objects are spatially diverse with respect to the given survey point.

18. The method of claim 16 including directing the camera to stop taking images of the given survey point location once a global position within a required tolerance is calculated for the survey point using the images.

19. The method of claim 16 wherein the images contain more than one object of interest and the images are used to determine global positions of more than one survey point.

20. The method of claim 16 wherein the camera is directed to take images of locations of selected points of interest at the survey site, the vision subsystem determines a global position for a point of interest using the images taken by the camera and associated global positions determined by the GNSS receiver, and the survey processing subsystem further coordinates global positions determined by the vision subsystem for the points of interest at the point of interest locations.

\* \* \* \* \*